Jan. 23, 1968 R. S. ZOLUDOW 3,365,131
ADJUSTABLE PNEUMATIC TEMPERATURE TRANSMITTER
Filed Aug. 11, 1966
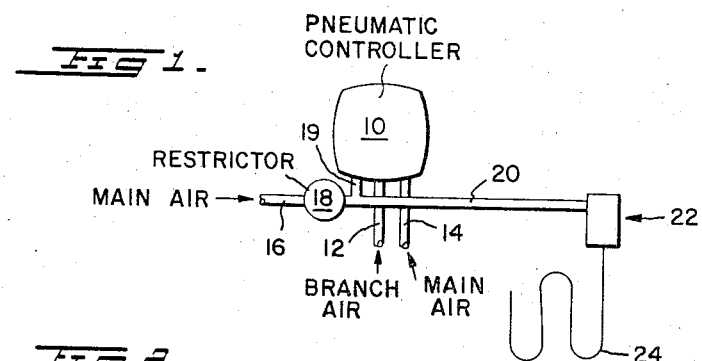
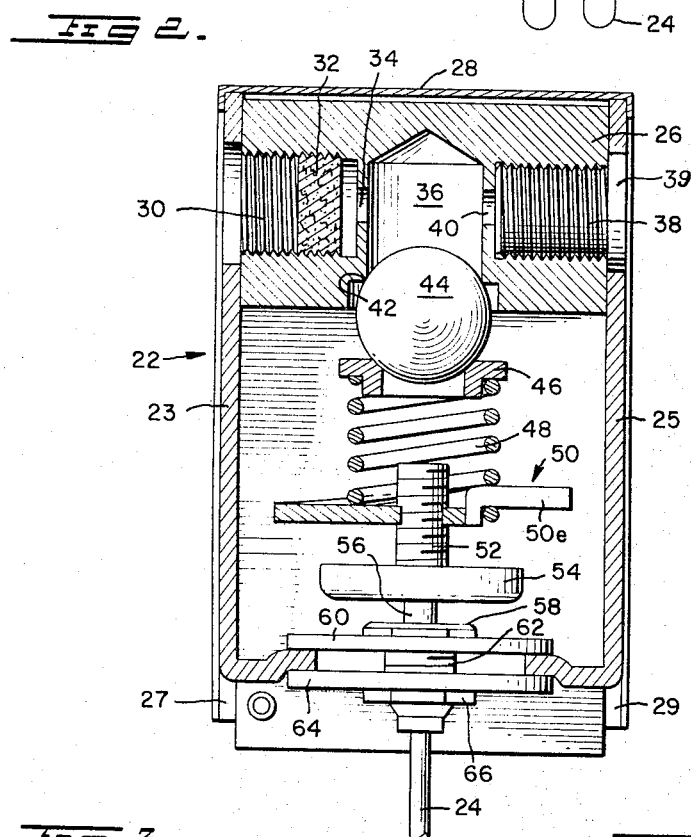
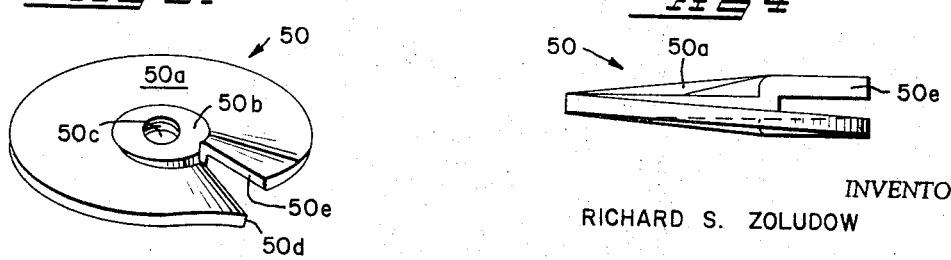
INVENTOR
RICHARD S. ZOLUDOW
BY Anthony A. O'Brien
ATTORNEY

United States Patent Office 3,365,131
Patented Jan. 23, 1968

3,365,131
ADJUSTABLE PNEUMATIC TEMPERATURE TRANSMITTER
Richard S. Zoludow, South Bend, Ind., assignor to Robertshaw Controls Company, Richmond, Va., a corporation of Delaware
Filed Aug. 11, 1966, Ser. No. 571,768
6 Claims. (Cl. 236—86)

This invention relates generally to pneumatic temperature transmitters, and more particularly, to a transmitter that senses temperature variations at a remote location and generates a proportional pneumatic signal analogous to the sensed temperature. Such transmitters are frequently employed in pneumatic control systems wherein temperature variations sensed at the remote location will reset a pneumatic controller by the issuance of the pneumatic signal. Previous conventional devices of this type have been so expensive to manufacture and so complicated in operation as to be generally impractical.

Accordingly, it is an object of the present invention to construct a reliable pneumatic temperature transmitter of simplified design with minimal fabrication costs.

Another object of this invention is to provide a manually adjustable disc for selectively altering the set point of the transmitter over a wide range of temperatures and pressures.

This invention has another object in that the transmitter employs a simple temperature sensing mechanism formed by solid charged capillary tubing.

Still another object resides in the use of power elements that are responsive to the volumetric expansion or contraction of the fluid in the capillary tubing to adjust the proportional signal generated by the transmitter.

In practicing the present invention, a pneumatic temperature transmitter has a pneumatic signal conduit adapted to deliver a pneumatic signal pressure to a controller, a valve housing having an inlet and outlet means, a chamber defined within the housing, valve means in the chamber for controlling a pneumatic flow between the inlet and outlet means, spring means operatively connected to the valve means, the inlet means communicating with the conduit whereby the pneumatic signal pressure therein is varied by the valve means, temperature sensing means extending from the valve housing to sense remote temperature, power transmitting mechanism positioned adjacent to one end of the temperature sensing means whereby expansion of the fluid within the temperature sensing means in response to an increase in temperature will actuate the power transmitting mechanism, such actuation of the power mechanism increasing the force of the biasing spring upon the valve means and consequently increasing the pneumatic signal pressure in the conduit leading to the controller.

Other objects and advantages of the present invention will become apparent from the following description of a preferred embodiment, taken in conjunction with the accompanying drawings wherein:

FIG. 1 is a schematic diagram of a pneumatic control system employing this invention;

FIG. 2 is a vertical cross-section of a pneumatic temperature transmitter;

FIG. 3 is a perspective of an adjusting disc; and

FIG. 4 is a side view of the adjusting device.

Referring now to FIG. 1, the present invention is embodied within a pneumatic control system including a pneumatic controller 10 having a branch air outlet conduit 12 and a main air inlet conduit 14. Since pneumatic controller 10 may be of any suitable conventional design, its particular structure is omitted for the sake of brevity. It need only be noted that the main air pressure from a pneumatic source (not shown) is fed to controller 10 which controls the air flow therethrough and delivers the branch air pressure to a control device. A typical control device would be a relay, as valve or a motor for controlling the operation of heating and/or air conditioning systems. In accordance with the present invention, pneumatic controller 10 may reset or vary the branch air pressure in response to a pneumatic signal from a remotely located temperature sensing device.

A main air conduit 16, which is connected to the pneumatic source, has a restrictor 18 disposed therein upstream of controller 10.

After passing through restrictor 18, a signal pressure is delivered to signal air conduit 20 as by a T-shaped fitting. One end of conduit 20 is connected to controller 10 via conduit 19 and the other end of this conduit is connected to a pneumatic temperature transmitter, indicated generally by reference numeral 22.

Transmitter 22 has a temperature sensing member 24 extending therefrom for sensing temperatures at the remote location being regulated by controller 10. In the preferred embodiment, solid charged capillary tubing is utilized as the sensing member.

Transmitter 22, as illustrated in FIG. 2, has a pair of sidewalls 23 and 25 with a block 26 of rectangular configuration extending horizontally therebetween at the upper end of the transmitter. A U-shaped cover member consisting of sidewalls 27 and 29, joined together by a horizontal bridging member 28, is slid downwardly at right angles to sidewalls until member 28 comes to rest against the upper surface of block 26. Such sliding motion is achieved by using small lateral flanges on the cover member to ride along the edges of sidewalls 23 and 25. Thus, a cavity of rectangular configuration is defined within the interior of transmitter 22, and since the casing is not air tight, the pressure within the cavity is gradually bled to atmosphere.

A threaded inlet passage 30, which is connected to signal air conduit 20, extends through sidewall 23 and into block 26. A filter 32 is positioned in passage 30 upstream of a narrow inlet passage 34 that communicates with centrally located enlarged cavity 36 in block 26. An identical aligned threaded inlet passage 38 passes through sidewall 25 into block 26 to establish communication with cavity 36 through narrow inlet passage 40.

In the transmitter shown in FIG. 2, a plastic cap 39 is threaded into the inlet passage 38 through sidewall 25 to prevent communication between cavity 36 and ambient conditions through such passage. Such identical passages through sidewalls 23 and 25 are provided so that transmitter 22 can be readily connected to a signal air conduit at either side of the housing.

An annular valve seat 42 is formed at the lower end of central cavity 36. A spherical ball valve 44 cooperates with seat 42 and is axially movable relative thereto. The underside of valve 44 is positioned within retainer 46, which is seated atop the upper end of a flattened coil in coil spring 48. An adjustable disc 50 retains the lower end coil of spring 48 thereupon.

The adjustable disc 50 is advanced axially along threaded stud 52, which is bottomed within the recessed interior of plate 54. The underside of plate 54 is contacted by power element 56, which is actuated in response to the temperatures sensed by tubing 24. Nuts 58 and 66 retain spacer discs 60 and 64 in position at the lower end of the transmitter housing, and a hollow guide 62 is inserted between the discs to maintain the capillary tubing in proper orientation to transmit power to element 56.

FIGS. 3 and 4 illustrate the details of the adjustable disc 50. Disc 50 has an outer radial segment 50a of helical configuration and a planar central section 50b with an aperture 50c situated therein. Aperture 50c is slightly larger in diameter than threaded stud 52 and has internal threads formed upon its peripheral wall for engagement with stud 52 for purposes to be described hereinafter. The pitch of segment 50a, as defined between lower terminus 50d and upper terminus 50e, is approximately equal to the pitch of the successive coils of spring 48.

Disc 50, therefore, exerts a compressive force of variable magnitude upon such spring as disc 50 is selectively advanced along stud 52 into the coils of spring 48 to alter the number of active coils disposed between disc 50 and seat 46. The complementary cooperating surfaces formed by segment 50a of disc 50 and the coils of spring 48 provide concurrent variation of both the number of active coils within spring 48 and the compressive forces exerted upon spring 48 and ball valve 44. Such concurrent variation permits finer and more accurate control of the setpoint adjustment for transmitter 22.

The above described structural components of transmitter 22 cooperate functionally in the following manner to transmit a proportional pneumatic signal change to controller 10 analogous to a temperature change sensed by capillary tubing 24. It is to be noted that the main air flow from conduit 16 is reduced to a desired flow rate by restrictor 18 so as to deliver a signal air pressure to the signal air conduit 20. Ball valve 44, a variable restrictor, functions in combination with fixed restrictor 18 to effectuate a pressure change in conduit 20. Hence, the signal air pressure sensed by controller 10 depends upon the condition of ball valve 44. This structural arrangement constitutes a single pipe pneumatic control device.

Tubing 24 is placed within the medium or zone to be controlled, such as the air temperature in a remote location. Increases in the temperature in the controlled zone will cause power element 56 to move upward, for the volume of the fluid contained in tubing 24 will be increased by the rising temperature. Element 56 forces plate 54 upwardly and plate 54 moves stud 52 axially upwardly. As stud 52 is moved, adjustable disc 50 compresses spring 48 and increases the force biasing ball valve 44 toward seat 42.

Ball valve 44 tends to seek a dynamic equilibrium position between the downward urging of the air pressure in inlet passage 30 and cavity 36 and the upward biasing of spring 48. When tubing 24 senses an increased temperature, the upward forces on ball valve 44 is increased so that ball 44 is forced closer to seat 42. The reduction in area between the ball 44 and the seat 42 increases the pressure in lines 19 and 20 leading to controller 10, and reduces the flow being bled through the housing to the atmosphere. Controller 10 will be adjusted in response to this signal of increased pressure in conduit 20.

Controller 10 will then issue an appropriate signal via conduit 12 to a suitable relay or valve to admit a cool air flow into the zone or area being regulated. As tubing 24 senses the reduced temperature in the regulated zone, the fluid within the tubing will be reduced in volume and power element 56 will decrease its upward force upon plate 54, stud 52 and disc 50 so that ball valve 44 will move away from seat 42 and the pressure level in line 20 will be lowered correspondingly.

The tension of spring 48, as well as the number of active coils therein, is varied by removing the cover and manually rotating disc 50 upon stud 52. As disc 50 advances axially upwardly along stud 52, the number of active coils in spring 48 will decrease, but each coil will be more tightly compressed thereby producing a resultant biasing force of increased magnitude for pressing ball valve 42 axially toward seat 42 is reduced. In either instance, the adjustment of disc 50 alters the amount of expansion required within the tube 24 before power element 56 will exert a force upon plate 54 of sufficient magnitude to influence ball valve 44. Accordingly, the actual temperature at which transmitter 10 will generate a given pressure signal to controller 10 is varied by the adjustment of the compressive load placed upon spring 48 by disc 50.

The set point of transmitter 22 is usually selected so that median air pressure is transmitted at the midpoint of the temperature operating range. Such range is the span of temperature variations required to cause a pressure change from the lowest pressure level to the highest pressure level. For example, if the normal range for pressure signals is 3–15 p.s.i.g., then the median pressure is 9 p.s.i.g. If it is desired that the environment in which tubing 24 is placed be maintained at 75° F. under normal operating conditions, then disc 50 is adjusted along stud 52 until the pressure in the signal air conduit 20 between restrictor 18 and transmitter 22 is 9 p.s.i.g.

After this adjustment, when the temperature in the environment to be controlled exceeds 75° F., then the fluid in tubing 24 will expand volumetrically an amount sufficient to enable power element 56 to force plate 54 and stud 52 upwardly and press ball valve 44 closer to seat 42. The pressure balance previously existing between the downward forces on ball 44 through passages 30, 34 and cavity 36 and the upward force exerted by spring 48 will be terminated as the upward force momentarily becomes greater. This will cause a pressure back-up in conduits 19 and 20, and controller 10 will issue a signal over branch air conduit 12 to reduce the temperature zone sensed by tubing 24 to 75° F. When the temperature drops below 75° F., the fluid in tubing 24 will contract and reduce the upward force upon plate 54 and the compressive force on spring 48. The downward pressure on ball 44 will then move ball 44 away from seat 42 and allow more signal air to pass through inlet 30 and passage 34 into cavity 36 and thence interior chamber before exiting to atmosphere through the casing. This reduces the pressure in signal air conduit 20 to the desired level and dynamic equilibrium condition is achieved.

Manifestly, the preferred embodiment of the present invention is subject to many modifications, variations and changes in details, which fall within the spirit and scope of the appended claims. Accordingly, such claims should be broadly construed commensurate with the advances in the arts and sciences achieved by this invention.

What is claimed is:

1. In a pneumatic temperature transmitter, the combination comprising:
 (a) pneumatic signal conduit means adapted to deliver a signal pressure to controller means,
 (b) a valve housing having inlet means and outlet means,
 (c) a chamber defined within said housing,
 (d) valve means in said chamber controlling a pneumatic flow between said inlet and outlet means,
 (e) spring means operatively connected to said valve means,
 (f) said inlet means communicating with said conduit means whereby the pneumatic signal pressure therein is varied by said valve means,
 (g) temperature responsive means extending from said valve housing to sense remote temperature variations, and
 (h) power means positioned in abutting relationship to said temperature responsive means whereby thermal expansion and contraction of said temperature responsive means effects a corresponding movement of said power means,
 (i) the movement of said power means varying the force of said spring means upon said valve means and thereby causing a corresponding variation of the pneumatic signal pressure in said conduit means,
 (j) said power means including a plate, a threaded stud extending upwardly from said plate, and an adjustable disc secured upon said stud, said stud serving as a seat for receiving one end of said spring means.

2. The combination as defined in claim 1 wherein said adjustable disc includes an annular inner segment having a central aperture with screw threads on the peripheral wall thereof, said screw threads enabling said disc to be adjusted along the length of said stud for varying the compressive force exerted upon said spring means.

3. The combination as defined in claim 1 wherein said adjustable disc further includes an outer radial segment of helical configuration and said spring means comprises a coil spring of helical configuration, the pitch of said outer segment being substantially equal to the pitch of said coil spring.

4. The combination as defined in claim 1 wherein said power means further comprises a power element located adjacent to said plate.

5. The combination as defined in claim 1 wherein said chamber is defined between a pair of spaced sidewalls joined by a horizontally extending block and a downwardly opening U-shaped closure member that rests upon said block to enclose the open space between said sidewalls.

6. The combination as defined in claim 5 wherein said inlet means extends horizontally into said block, and a downwardly opening annular valve seat is formed in the bottom of said block for establishing communication between said inlet means and said cavity.

References Cited

UNITED STATES PATENTS

| | | | |
|---|---|---|---|
| 1,175,171 | 3/1916 | Nelson | 236—86 X |
| 2,724,555 | 11/1955 | Roetter | 236—86 |
| 2,774,377 | 12/1956 | MacDuff | 236—86 |
| 3,135,495 | 6/1964 | Ferris | 236—86 |
| 3,186,641 | 6/1965 | Goodman | 236—86 |

WILLIAM J. WYE, *Primary Examiner.*